United States Patent [19]

Keefe

[11] 3,924,106

[45] Dec. 2, 1975

[54] BACKGROUND COMPENSATION FOR A RADIATION LEVEL MONITOR

[75] Inventor: Donald J. Keefe, Lemont, Ill.

[73] Assignee: The United States of America as represented by the United States Energy Research and Development Administration, Washington, D.C.

[22] Filed: Oct. 31, 1974

[21] Appl. No.: 519,491

[52] U.S. Cl. ........ 235/92 PC; 235/92 EV; 235/92 R
[51] Int. Cl.² ...................... G06M 3/14; G01T 1/00
[58] Field of Search....... 235/92 PC, 92 EV, 92 CA; 250/336

[56] References Cited
UNITED STATES PATENTS
2,991,365   7/1961   Churchill .................... 235/92 PC
3,725,688   4/1973   Brunson et al. ............. 235/92 PC Primary Examiner—Joseph M. Thesz, Jr.
Attorney, Agent, or Firm—Dean E. Carlson; Arthur A. Churm; Paul A. Gottlieb

[57] ABSTRACT

Background compensation in a device such as a hand and foot monitor is provided by digital means using a scaler. With no radiation level test initiated, a scaler is down-counted from zero according to the background measured. With a radiation level test initiated, the scaler is up-counted from the previous down-count position according to the radiation emitted from the monitored object and an alarm is generated if, with the scaler having crossed zero in the positive going direction, a particular number is exceeded in a specific time period after initiation of the test. If the test is initiated while the scaler is down-counting, the background count from the previous down-count stored in a memory is used as the initial starting point for the up-count.

5 Claims, 2 Drawing Figures

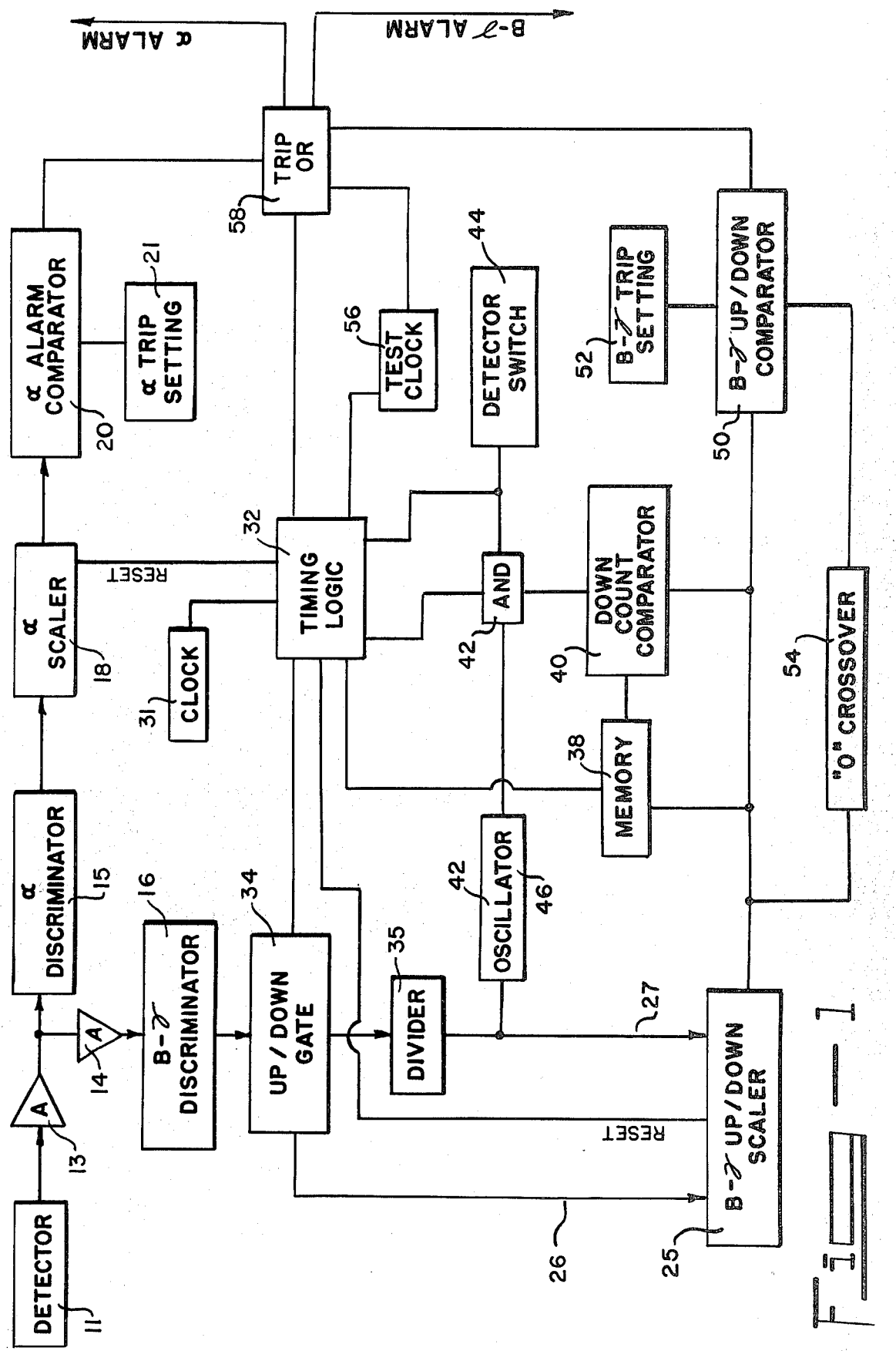

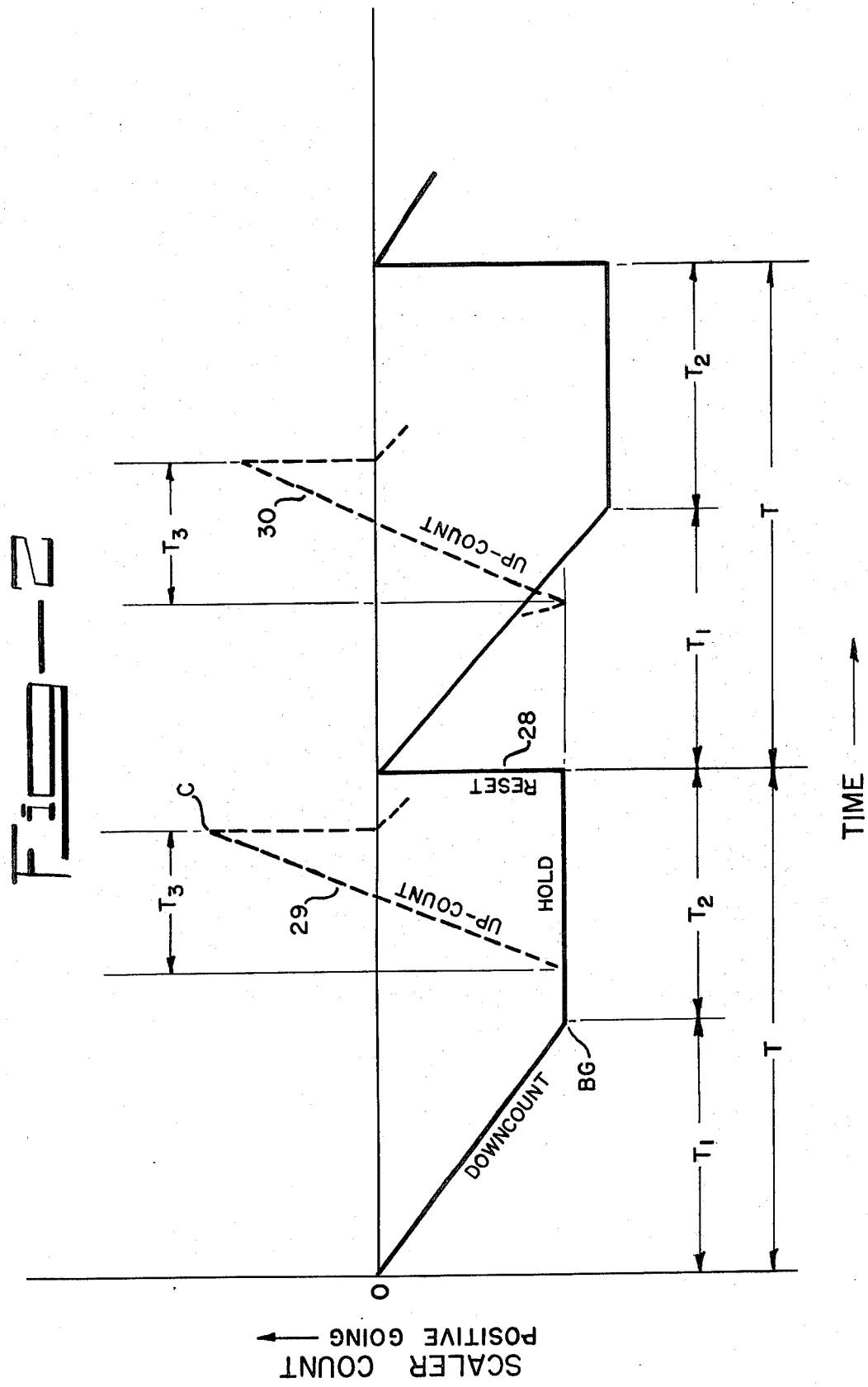

3,924,106

BACKGROUND COMPENSATION FOR A RADIATION LEVEL MONITOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

A hand and foot monitor is a type of radiation detection device intended to determine the level of contamination of people working in a radiation environment. It must determine the radiation present on a particular area of the individual while subtracting out any background radiation which would contribute to the monitor's radiation level count. As with most radiation level tests, some means must be provided to determine the background. Previously this has been done by statistical prior calculation or by on-spot analog background counting. Analog means usually involve charging a capacitor to a level proportional to the amount of background radiation present. Problems with charging of a capacitor for background count include leakage from the capacitor which will lessen the background count and the temperature instability of capacitors.

It is therefore an object of this invention to provide a means for background count compensation in a radiation level monitor.

Another object of this invention is to provide a digital means for background count compensation in a radiation level monitor.

SUMMARY OF THE INVENTION

There is disclosed digital means for providing background compensation in a radiation level monitor. A scaler is down-counted from zero to establish a background count. When a radiation level test has been initiated, the scaler is up-counted from the background count. If the test is initiated while the scaler is down-counting, a memory circuit is provided which rapidly down-counts the scaler to the previous background count from which point the scaler is up-counted for the test. The value of the scaler at the end of the test period is the contamination level with background subtracted out. An alarm circuit develops an alarm with the contamination level exceeding a particular level within a specific time period.

BRIEF DESCRIPTION OF THE DRAWINGS

FIG. 1 is a block diagram of the radiation level monitor, and

FIG. 2 is a time diagram of the response of the scaler of the radiation level monitor.

DETAILED DESCRIPTION

Referring to FIG. 1, there is shown a block diagram of a radiation detector with background compensation. Such a monitor might be a hand and foot monitor for simultaneously monitoring the hands and feet for radiation contamination, such as for alpha and beta-gamma radiation. In practice, a hand and foot monitor is comprised of four independent channels of detectors, one for each hand and foot. Each channel has subchannels for the particular type of radiation to be monitored. For illustrative purposes, FIG. 1 illustrates one channel of a monitor having subchannels for the detection of alpha and beta-gamma radiation.

Detector 11 is a device which generates pulses in response to incident radiation upon it, such as a gas-flow detector. In such a detector, the height of the output pulse varies according to the type of incident radiation. The pulses are amplified by amplifier 13 and distinguished according to height by discriminators 15 and 16. Discriminators 15 and 16 are devices which generate output pulses of fixed amplitude in response to input pulses of particular height or greater. Discriminator 15 is an alpha discriminator and is set to develop an output pulse when a pulse corresponding in height to that caused by alpha radiation is generated by amplifier 13. A pulse will be caused by alpha radiation of much greater amplitude than the pulses caused by beta-gamma radiation. Beta-gamma pulses are generated by either beta or gamma radiation incident on detector 11 which generally cannot be distinguished as being beta or gamma in origin. Because the number of alpha pulses is very much less than the number of beta-gamma pulses (for example, of 140 pulses about 4 are alphas with the rest beta-gamma), in the embodiment shown in FIG. 1 the beta-gamma sub-channel is made to count all pulses developed by detector 11. Thus the signal from amplifier 13 is amplified by amplifier 14 to raise the magnitude of the beta-gamma pulses to a useable height and discriminator 16 generates output pulses of fixed amplitude in response to beta-gamma and alpha pulses.

The alpha subchannel, shown in FIG. 1, has no background compensation provided because generally there are too few alphas present in background to make it worth-while to provide for such compensation. Therefore, the alpha subchannel is simply provided with an alpha scaler 18, a device for counting the number of alpha pulses detected by discriminator 15, and developing an output signal corresponding to the count recorded by scaler 18, and an alpha alarm comparator 20, which compares the number of pulses counted by scaler 18 with a predetermined number established by alpha trip setting 21. If the number of counts recorded by the scaler equals or exceeds the output of the trip setting, an alarm is generated by alpha comparator 20.

The beta-gamma subchannel is provided with a digital background compensation system. The background count is subtracted from the background plus contamination count to determine the level of contamination. This is done by means of a scaler 25 which counts the number of pulses applied to it and develops an output indicating this number. The scaler can be made to either up-count, that is count in the positive going direction, or down-count, that is count in the negative going direction. It is generally a circular counting device in that, when it reaches its maximum count possible, it simply returns to 0, that is the count goes from 999 to 000 to 001. Pulses applied to input terminal 26 of scaler 25 cause scaler 25 to up-count in the positive going direction, e.g. 001, 002, 003 . . . while pulses applied to input terminal 27 cause scaler 25 to down-count in the negative going direction, e.g. 000, 999, 998, . . . Essentially the background count is provided by first taking a background count by scaler 25 of pulses developed by beta-gamma discriminator 16 in the down-count direction. Then when a radiation level test is requested, the scaler 25 counts up from the previously held background count. For example, for a background count, scaler 25 might down-count 000, 999, . . . to 960 which is the final background count.

When the up-count is requested, it counts from 960, 961 ... to 000 and on to 020, with 20 being the total contamination level with background subtracted out. This total contamination level recorded on scaler 25 is held by the scaler until the counter is reset to 000 just prior to the next background count.

The timing of the counting and the test cycles is illustrated in FIG. 2 which illustrates with respect to time the level of the scaler's output signal which is representative of the count recorded by the scaler. Curve 28 represents the count recorded by the scaler with respect to time with no test initiated. With no test initiated, the background count is continually updated each time period T. This is accomplished by down-counting the scaler for a time period $T_1$, at which time the scaler count is at point BG and then holding the scaler count at BG for a time period $T_2$. After $T_2$ is completed, the scaler is reset to 000 and a down-count is again taken. When a test is initiated during $T_2$, the scaler counts upward from BG for a time period $T_3$, at which time the scaler will be at a final test value at point C, as shown by curve 29. In practice, $T_3$ is made much shorter than $T_1$ so the test may be quickly completed and $T_1$ is made much longer with respect to $T_3$ so that a statistically accurate background count can be achieved. Therefore the number of pulses used to down-count during $T_1$ should be divided by the quantity $T_1$ divided by $T_3$. For example, if $T_1$ is 32 seconds and $T_3$ is 4 seconds, the number of pulses during $T_1$ used to down-count scaler 25 is divided by 8. The higher this number, the more statistically accurate the background count. The value of the scaler count is stored in a memory at the end of $T_1$, as will be described, so that in case a test is initiated during the next $T_1$ while the scaler is down-counting the number stored in the memory is used as the background count. If a test is initiated during $T_1$ while the scaler is down-counting, the scaler is made to down-count rapidly to the number stored in the memory and the test is then initiated with the up-count, as shown by curve 30.

Control over the up- and down-counting of scaler 25 is provided by background clock 31, timing logic 32 and up/down gate 34. The state of gate 34 controls whether the pulses developed by discriminator 16 are applied to up-count terminal 26 or to down-count terminal 27 or whether no pulses are applied to scaler 25. The state of gate 34 is controlled by timing logic 32. Background clock 31 has a period of T. It is designed to provide the timing signals for timing logic 32 to allow timing logic 32 to control the state of gate 34. With no test, timing logic 32 alternates the state of gate 34 from applying pulses to down-count terminal 27 and the no-pulse application state and resets scalers 18 and 25 to 000 at the end of the no-pulse application state. This may be done with background clock 31 having subperiods of $T_1$ and $T_2$, with $T_1$ plus $T_2$ equalling T. Every period T background clock 31 delivers pulses to timing logic 32 for a duration of $T_1$. For $T_2$ no pulses are delivered. Timing logic 32 is responsive to the pulses developed during $T_1$ to cause gate 34 to assume the state in which all pulses developed by discriminator 16 are applied to down-count terminal 27 to establish the background count. Divider 35 divides the number of pulses applied to down-count terminal 27 by $T_1/T_3$, as previously described.

Detector switch 44 is actuated by the initiation of a radiation level test, and its signal is applied to the timing logic 32. Timing logic 32, after a short delay to allow for any rapid down-count of scaler 25 as will be described, causes gate 34 to assume the state where pulses developed by discriminator 16 are applied to up-count terminal 26 and the scaler is up-counted as described above. The value in scaler 25 as the up-count proceeds is compared by beta-gamma comparator 50 with a predetermined number established by trip setting 52. Since a scaler is a circular counting device, while the scaler is still below 000 the comparator 50 would indicate the trip has been exceeded. Therefore a zero crossover comparator 54 is provided. It monitors the scaler count value and inhibits comparator 50 from generating an output until value of the scaler has crossed zero in a positive going direction. Then, when comparator 50 senses that the value of the scaler count has exceeded the trip setting of trip setting 52, comparator 50 develops an alarm signal.

For a test initiated during $T_1$, a memory 38 is provided. At the end of each down-count, that is at the end of $T_1$, timing logic 32 enables memory 38 to store the value of the scaler count at that instant. The value stored in memory 38 is compared with the value of the scaler count by down-count comparator 40 which, with the value in the memory less than that of the scaler count, develops an output signal. This output signal is applied to AND gate 42 along with the signal from detector switch 44, which is developed when a test has been initiated and an enabling signal from the timing logic. The enabling signal is developed by the timing logic for a preset time after a signal is developed by detector switch 44. If the signal from switch 44, the enabling signal and the signal from comparator 40 occur simultaneously, the AND 42 enables a fast oscillator 46 to apply pulses rapidly to down-count terminal 27. Oscillator 46 stays enabled until scaler 25 has been rapidly down-counted to the value in the memory, at which time comparator 40 will cease to develop an output and the AND will no longer enable oscillator 46. The enabling signal lasts only long enough for any down-count so the rapid down-count will not begin again after the up-count begins. In this way, the value stored in memory 38 is used as the background count for a test initiated during $T_1$.

Scalers 18 and 25 merely count pulses and their count is compared with trip settings. In order for an alarm to be generated for each type of radiation, the number of counts must exceed the trip setting in a particular time period previously indicated by $T_3$. Therefore test clock 56 is provided which is activated by timing logic 32 when a test has been initiated and detector switch 44 is activated. Its signal is applied along with the signals from comparators 20 and 50 to trip OR 58. If no alarm is generated within the time period $T_3$, the OR prohibits any further alarm from being generated. If the alarm has been generated within $T_3$, then the appropriate alarm mechanisms are actuated. In either case, after expiration of $T_3$, trip OR resets timing logic 32. Timing logic 32 restarts clock 31 and resets scalers 18 and 25 to 0 and the background compensation down-count is started again. Memory 38 retains its last value of scaler count until another time period $T_1$ has been completed.

The embodiments of the invention in which are exclusive property or privilege is claimed are defined as follows:

1. In a radiation level testing device including a radiation detector for producing radiation pulses in response to radiation detected thereby and a switch which develops a switch signal when activated to initiate a radiation level test, an apparatus for developing background compensation, comprising:

an up-down counter having first and second input terminals, said up-down counter being responsive to signals applied to said first input terminal to count in a negative direction and signals applied to said second input terminal to count in a positive direction, a signal gate coupling the radiation detector to said first and second input terminals, a timing circuit coupled to said signal gate, said up-down counter and the switch, in the absence of the switch signal said timing circuit acting to develop periodically a first timing signal having a period $T_1$ and causing said up-down counter to reset to zero at the beginning of the period $T_1$, said signal gate being responsive to said first time signal to couple said radiation pulses to said first input terminal, a memory circuit coupled to the switch, said timing circuit and said up-down counter, and being capable of generating pulses, said memory circuit being responsive to the switch signal occurring during the period $T_1$ of said first timing signal to apply pulses to said first input terminal until the count of said up-down counter is equal to the lowest value of the count of said up-down counter during the period $T_1$ of the previous first timing signal, said timing circuit being responsive to the switch signal to cause said signal gate to couple the radiation pulses to said second input terminal after said up-down counter has ceased down-counting, and a first comparator circuit coupled to said up-down counter and said switch and being responsive to a count in said up-down counter greater than a predetermined value within a period $T_2$ after said signal gate circuit couples the radiation pulses to said second input terminal to generate an alarm signal.

2. The apparatus of claim 1 wherein $T_1$ is a particular multiple of $T_2$ and further including divider means coupled to said signal gate circuit and said first input terminal for dividing the number of radiation pulses applied to said first input terminal by said particular multiple.

3. The apparatus of claim 2 wherein said memory circuit includes a memory responsive to the end of said first timing signal to store the count in said up-down counter, a second comparing circuit coupled to said up-down counter and said memory, said second comparing circuit acting to compare the count in said memory and said up-down counter and to develop a control signal with the count in said memory less than the count in said up-down counter, a pulse generation circuit coupled to said first input terminal, and a control gate coupled to said pulse generation circuit, the switch and said second comparing circuit, said control gate being responsive to said control signal and the switch signal to develop a signal to turn on said pulse generation circuit to provide thereby pulses to count down rapidly said up-down counter, said timing circuit acting to inhibit said control gate from turning on said pulse generation circuit after $T_2$ has begun.

4. The apparatus of claim 3 wherein said first comparing circuit includes an alarm comparator responsive to the count of said up-down counter greater than said predetermined value to generate a comparator signal, a zero crossover comparator coupled to said alarm comparator and responsive to the count of said up-down counter to inhibit said alarm comparator from generating said comparator signal until the value of said count scaler has crossed zero in the positive going direction, and a trip alarm gate coupled to said switch and said alarm comparator and responsive to said comparator signal developed within said period $T_2$ after the switch signal is developed to develop said alarm signal.

5. The apparatus of claim 4 wherein with a switch signal developed and $T_2$ expired, said timing circuit resets said up-down counter to zero and undevelops said switch signal.

* * * * *